No. 785,059. PATENTED MAR. 14, 1905.
J. H. WHITE.
GATE.
APPLICATION FILED APR. 13, 1904.
2 SHEETS—SHEET 1.
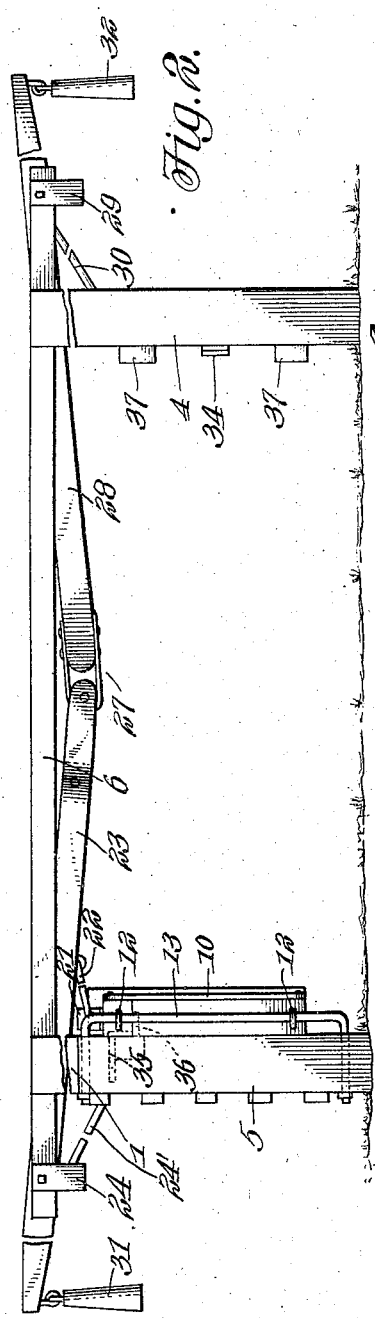
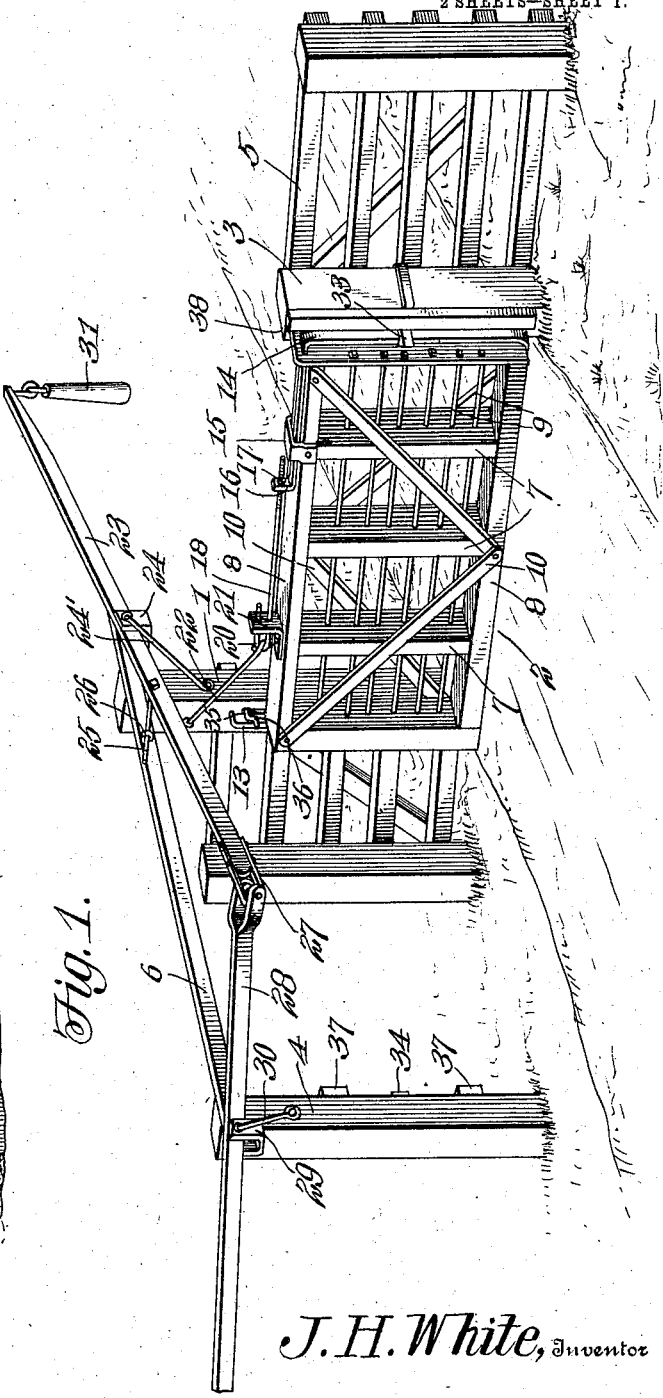
J. H. White, Inventor
Witnesses

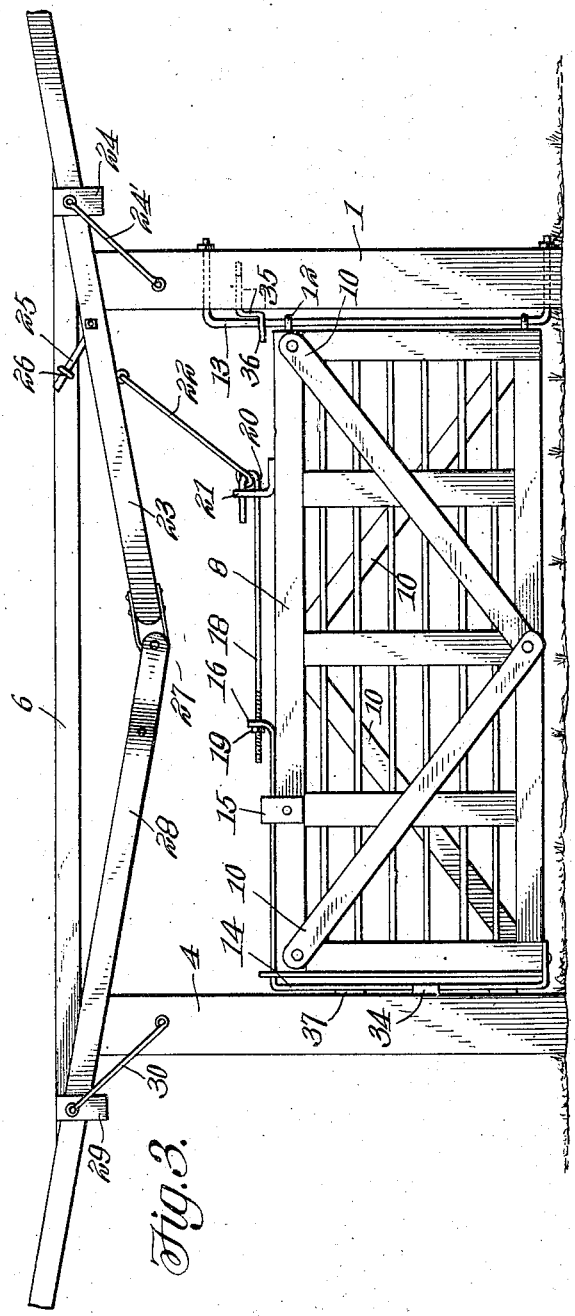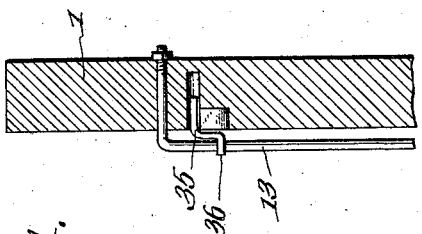

No. 785,059.　　　　　　　　　　　　　　　Patented March 14, 1905.

UNITED STATES PATENT OFFICE.

JOHN H. WHITE, OF TUSCOLA, ILLINOIS.

GATE.

SPECIFICATION forming part of Letters Patent No. 785,059, dated March 14, 1905.

Application filed April 13, 1904. Serial No. 203,017.

*To all whom it may concern:*

Be it known that I, JOHN H. WHITE, a citizen of the United States, residing at Tuscola, in the county of Douglas and State of Illinois, have invented certain new and useful Improvements in Gates; and I do declare the following to be a full, clear, and exact description of the invention, such as will enable others skilled in the art to which it appertains to make and use the same.

This invention relates to improvements in gates.

The object of the invention is to provide a gate and means whereby the same may be operated by an occupant of a vehicle without getting out of the same.

Another object is to provide means for raising the gate to permit the same to be swung over deep snow or to allow small stock to pass beneath the same.

A further object is to provide a gate of this character which will be simple, strong and durable, inexpensive, and well adapted to the purpose for which it is designed.

With these and other objects in view the invention consists of certain novel features of construction, combination, and arrangement of parts, as will be more fully described, and particularly pointed out in the appended claim.

In the accompanying drawings, Figure 1 is a perspective view of a gate constructed in accordance with the invention, showing the same in closed position. Fig. 2 is a side elevation showing the gate closed and in an elevated position. Fig. 3 is a similar view of the operating mechanism, showing the gate open and in a lowered position. Fig. 4 is a detail sectional view through the hinge-post.

Referring to the drawings, 1 denotes the hinge-post.

2 denotes the gate.

3 denotes the latch-post of the fence.

4 denotes the latch-post for holding the gate in open position.

5 denotes the fence.

6 denotes a brace-bar which connects the upper end of the hinge-post 1 and the latch-post 4.

The gate 2 may be of any suitable construction and is shown as being formed of vertically-disposed bars 7, connected at their upper and lower ends by longitudinal bars 8, between which are arranged a number of longitudinally-disposed steel rods 9. The gate is braced on each side by pairs of oppositely-inclined brace-bars 10. The gate is pivotally connected or hung on the hinge-post 1 by eyebolts 12, which loosely engage a vertical hinge-bar 13, secured to the hinge-post. The bar 13 is of greater length than the width of the gate and is spaced from the hinge-post and secured thereto at its upper and lower ends by bending said ends at right angles and passing the same through openings, where they are secured to the opposite side of the post, thereby forming a long rigid hinge-bar.

On the free end of the gate is secured a vertically-disposed spring latch-bar 14, which is bent rearwardly at its upper end to form a right-angularly-disposed arm, which is slidably mounted in guide-brackets 15 on the upper bar of the gate. The inner end of this portion of the latch-bar is turned up, as at 16, and is provided with an aperture 17, through which passes the end of a latch-actuating rod 18, said rod being threaded to receive a nut 19, by which the same is adjustably connected with said latch-bar. The opposite end of the rod 18 is bent upon itself in the form of a loop 20, which is slidably mounted in an apertured bracket 21, secured to the upper bar of the gate. To said looped end 20 of the rod 18 is loosely connected the lower end of a link-rod 22, the upper end of which is connected to an operating-lever 23, which is pivotally mounted in a stirrup-bracket 24, secured to one end of the brace-bar 6. This connection is braced by an inclined brace-rod 24', secured to the hinge-post and to the pivot-bolt of said lever. The lever 23 is further held in place by an L-shaped bar 25, one end of which passes through the lever and is provided with a nut and the opposite end of which slidably engages an eyebolt 26 on said brace-bar, as shown. On the inner end of the lever 23 is secured a loop or bail shaped extension 27, to which is loosely connected the inner end of a similar operating-lever 28, pivotally mounted in a stirrup-bracket 29, secured to the opposite end of the brace-bar 6, this bracket being also braced by a brace-rod 30. To the outer ends of the operating-levers 23 and 28 are loosely connected depending handles or grips 31 and 32, by which said levers may be operated. When in closed position, the latch-bar is adapted to engage a catch 33 on the latch-post 3, and when the gate is in open position the latch-bar will engage the catch 34 of the latch-post 4.

It is sometimes desirable, as in case of a deep snow or to permit small stock to pass through, to raise the gate a short distance, this movement being permitted by providing the long hinge-bar 13, which projects above the normal position of the gate, as shown in Figs. 1 and 3. In order to hold the gate in its raised position, a stop-pin 35 is provided, said pin being formed with an offset finger 36 and slidably mounted in an opening or hole in the hinge-post 1. When the gate is being raised, the pin 35 is pushed into the opening in the post, and after the gate is up the pin is pulled out and the finger 36 on the same engages under the upper bar of the gate and holds the same in raised position and permits said gate to be swung to an open or closed position by the operating-levers, as hereinafter described. The stop-pin may also be pulled out to engage the upper edge of the gate when the same is in lowered position, thereby preventing the same from being raised.

The hinge-post is braced by an inclined brace-rod which is connected at one end to the upper portion of the post and at its opposite end to the lower portion of a fence-post.

To open the gate from either side, one or the other of the operating-levers is given a downward pull by its handle, which will raise the inner ends of the levers, thereby drawing on the link-rod 22, which will slide the rod 18 in its bearing-bracket and cause said rod to draw on the latch-bar, thereby releasing the same from the catch on the fence-post. Further pull on the operating-lever will cause the gate to swing around and engage stops 37 on the latch-post 4 and cause the latch-bar to engage the catch 34 on this post, thereby holding the gate in open position. After passing through the gate the operator grasps the handle of the operating-lever on that side of the gate and upon pulling the same down will release the latch-bar as before and swing the gate back into engagement with the latch-post 3 of the fence, when the latch-bar will spring into engagement with the catch 33 on this post. A stop-bar 38 is secured to the post 3 to prevent the gate from swinging past the post, as will be understood.

By forming the latch-bar along the entire length of the front edge of the gate the same will engage the retaining-catches 33 or 34 no matter how high the gate may be raised when opened or closed.

The sliding connection between the turned-up end of the latch-bar and the latch-actuating bar 18 permits the latch to spring into engagement with the catches 33 or 34 without jarring the operating mechanism.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

A swinging gate having a latch-bar on the outer side of its free end, the lower end of the latch-bar being fast to the gate and the upper portion of the latch-bar being bent to extend rearwardly on the upper side of the gate and then upturned at its inner end, in combination with a guide on the gate for the inner portion of the latch-bar, a bracket on the upper side of the gate, a rod guided in said bracket, extending through an opening in the upturned inner end of the latch-bar and having an adjusting-nut engaging said upturned inner end of the latch-bar, an operating-lever, and a link-rod connecting the latter to the first-mentioned rod, substantially as described.

In testimony whereof I have hereunto set my hand in presence of two subscribing witnesses.

JOHN H. WHITE.

Witnesses:
A. W. WALLACE,
J. A. HARRELL.